（12） United States Patent
Kieffer et al.

(10) Patent No.: US 11,297,819 B2
(45) Date of Patent: Apr. 12, 2022

(54) MOBILE HEATING APPARATUS AND METHOD

(71) Applicant: SISU COMMERCIAL PRODUCTS, LLC, Tulsa, OK (US)

(72) Inventors: Jeffrey Kieffer, Tulsa, OK (US); Scott Taylor, Broken Arrow, OK (US)

(73) Assignee: SISU COMMERCIAL PRODUCTS, LLC, Tulsa, OK (US)

( * ) Notice: Subject to any disclaimer, the term of this patent is extended or adjusted under 35 U.S.C. 154(b) by 0 days.

(21) Appl. No.: 15/350,072

(22) Filed: Nov. 13, 2016

(65) Prior Publication Data

US 2020/0008416 A1 Jan. 9, 2020

(51) Int. Cl.
*A01M 1/20* (2006.01)
*F24H 3/02* (2022.01)

(52) U.S. Cl.
CPC ........... *A01M 1/2094* (2013.01); *F24H 3/025* (2013.01)

(58) Field of Classification Search
CPC ............................. F24H 3/025; A01M 1/2094
See application file for complete search history.

(56) References Cited

U.S. PATENT DOCUMENTS

2015/0128483 A1* 5/2015 Krupp .................... F24D 5/04
43/132.1

* cited by examiner

*Primary Examiner* — Alfred Basichas
(74) *Attorney, Agent, or Firm* — Capehart Law Firm

(57) ABSTRACT

The present invention provides for a mobile heating apparatus for heating an enclosed space to a temperature sufficient to kill bed bugs. The mobile heating apparatus has a recirculation chamber having a fresh air inlet configured to receive fresh air from a fresh air area and a recirculation air inlet configured to receive recirculation air from a heated air area. The fresh air area is located outside of the area to be heated. The heated air area is located within the area to be heated. The apparatus also has an air mixture/circulation apparatus configured to mix the fresh air and the recirculation air and an air heating chamber having a heat exchanger. A mixed air inlet is in communication with the air mixture/circulation apparatus. A heated air outlet is configured to route the heated air into the heated air area. A heating apparatus is configured to provide heated combustion flow to the heat exchanger. The present invention also provides for a related method.

20 Claims, 5 Drawing Sheets

MOBILE HEATING APPARATUS AND METHOD

BACKGROUND OF THE INVENTION

Field of the Invention

The present invention is generally directed toward a heating apparatus, and more specifically, toward a mobile heating apparatus and related method of use for the eradication of beg bugs.

Background

Bed bugs are an incredibly difficult pest to control because they are so good at hiding in tiny cracks and crevices. Also, modern bed bug populations are highly resistant to the insecticides used for their control. Because bed bugs are difficult to access, and our insecticides do not work as well as we would like, home owners and pest management professionals have been searching for novel ways to kill bed bugs inside a structure.

Heat is known to be a very effective bed bug killer and it can be used in many different ways to treat infestations. Research has determined the thermal death points (the temperature at which a bed bug dies) for bed bugs and their eggs, as measured by temperature and exposure time to be 118° F. at a constant exposure for 90 minutes or more.

Heating units that utilize propane or other gas are known in the prior art. These units, however, had disadvantages. One category of heaters utilizes a heating unit that is located outside the room that is needed to be disinfected. These heaters utilize a series of ducts to provide the heated air into the desired location. This type of system is not efficient, is cumbersome to operate and requires extensive setup and takedown time due to the use of the ducts. Further, there is a concern for unintended damage caused by ducts which become overheated. The other category of prior art heaters utilize a heating unit placed within the desired location. These prior art units are self-contained and carry their fuel inside of the unit. This type of system has a flaw in that the fuel source will be heated at the same time as the desired location which could lead to unanticipated damage. Further, due to the length of time the unit needs to operate in order to treat infestations, the volume of fuel is prohibitive.

Thus, there is a need for an improved mobile heating unit to be used to eradicate bed bugs.

BRIEF SUMMARY OF THE INVENTION

The present invention satisfies the needs discussed above. The present invention is generally directed toward a heating apparatus, and more specifically, toward a mobile heating apparatus and related method of use for the eradication of beg bugs.

One aspect of the present invention is directed toward a mobile heating apparatus located within an area to be heated, such as a room within a house or hotel. The mobile heating unit includes an air mixture chamber having a recirculation air inlet configured to receive recirculation air from the area to be heated and a fresh air inlet configured to provide fresh air from a fresh air area located outside of the area to be heated. Fresh air is otherwise known as dilution air. The air mixture chamber is configured to mix the fresh air and the recirculation air.

The mobile heating unit further includes an air heating chamber having a mixed air inlet in communication with the air mixture chamber. This air inlet provides access for the mixed fresh air/recirculation air to enter into the air heating chamber. A heating apparatus is in communication with the air heating chamber. This heating apparatus provides heat to the fresh air/recirculation air mixture thereby heating the air mixture. A heated air outlet allows for the heated air mixture to exit the present invention and into the area to be heated. By adding additional heat to the recirculated air from the area to be heated, the temperature of the exiting heated air mixture is greater than that of the entering recirculated air.

One aspect of the air mixture chamber can include an air mixture/circulation apparatus configured to mix the fresh air and the recirculation air prior to the mixed air entering the air heating chamber. This apparatus can include a circulating fan and a motor and can be configured to create an air flow from air mixture chamber through the air heating chamber.

One aspect of the heating apparatus includes a heat exchanger having a coiled tube located within the air heating chamber and having a first end in communication with the heat source and a second end in communication with the heated air outlet. The heat source, such as a gas burner, provides heated combustion gas/air through the coiled tube such as that the coiled tube increases in temperature. As the coiled tube is located within the air heating chamber, when the mixed fresh air/recirculation air passes across the coiled tube, the mixed air increases in temperature. By routing the heated air mixture and the heated combustion gas/air flow into the area to be heated, such area is heated in an efficient and effective manner.

One aspect of the heat source includes at least one gas burner, such as an inshot burner. The fuel source, such as liquefied petroleum gas or natural gas, for the heat source is located outside the area to be heated. The gas burner is configured to provide heated combustion gas/air flow through the coiled tube.

Another aspect of the present invention is directed toward the mobile heating apparatus set out above that further includes a power vent in communication with the second end of the heat exchanger. This power vent includes a draft inducer fan and motor and is configured to pull the heated combustion gas/air flow through the coiled tube and into the area to be heated.

Another aspect of the present invention is directed toward the mobile heating apparatus set out above that further includes a flesh air intake duct having a first end in communication with the fresh air inlet and a second end in communication with the area to be heated. This fresh air can be used to dilute the products of combustion contained within the heated combustion gas/air flow to maintain safe levels of carbon monoxide (CO) and nitrogen dioxide (NO2). Additionally, the fresh air can be routed to the electronic controls within the inventive apparatus to increase the life expectancy of such electronics.

Another aspect of the present invention is directed toward the mobile heating apparatus set out above that further includes at least one controller and at least one sensor to monitor and control carbon monoxide levels, air flow levels and temperature levels.

It is to be understood that the invention is not limited in its application to the details of the construction and arrangement of parts illustrated in the accompanying drawings. The invention is capable of other embodiments and of being practiced or carried out in a variety of ways. It is to be understood that the phraseology and terminology employed herein are for the purpose of description and not of limitation.

Upon reading the above description, various alternative embodiments will become obvious to those skilled in the art. These embodiments are to be considered within the scope and spirit of the subject invention, which is only to be limited by the claims which follow and their equivalents.

DESCRIPTION OF THE INVENTION

The present invention satisfies the needs discussed above. The present invention is generally directed toward a heating apparatus, and more specifically, toward a mobile heating apparatus and related method of use for the eradication of beg bugs.

Figure 1:
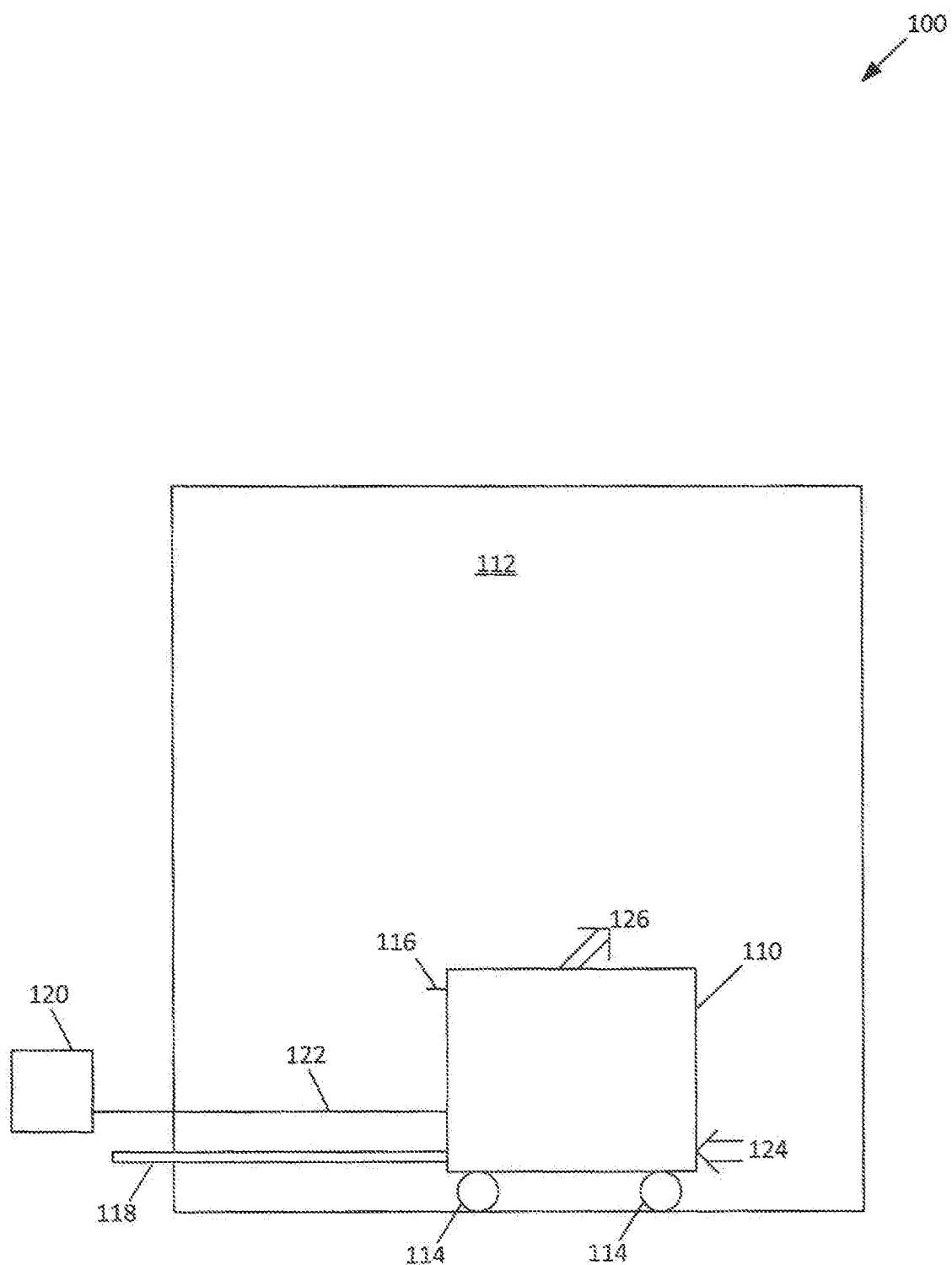
FIG. 1 is a perspective view of an embodiment of the present invention.

FIG. 1 is a perspective view of an embodiment 100 of the mobile heating apparatus 110 of the present invention. This embodiment 100 illustrates the mobile heating apparatus 110 being located within an area to be heated 112 and having wheels 114 and a handle 116 to assist with mobility. Further illustrated is the flow of recirculation air 124 having a temperature of T1 into mobile heating apparatus 110 and the flow of heated air 126 having a temperature of T2 out of mobile heating apparatus 110 and into the area to be heated 112. As the heated air 126 recirculates back into mobile heating apparatus 110, the exiting heated air 126 increases in temperature until the desired temperature is reached.

The fuel 120 for mobile heating apparatus 110 is located outside of the area to be heated 112 and is in communication with the mobile heating apparatus 110 by a fuel line 122. Having the fuel source being located outside the area to be heated 112, allows for the monitoring for safety and for sufficient volume without affecting the internal temperature of the fuel source 120. A fresh air intake duct 118 is in communication with mobile heating apparatus 110. Fresh air intake duct 118 allows for fresh air to be provided into mobile heating apparatus 110. The fresh air can be used in the process to heat the area to be heated 112 as well as provide fresh air to the electrical components within the mobile heating apparatus 110.

Figure 2:
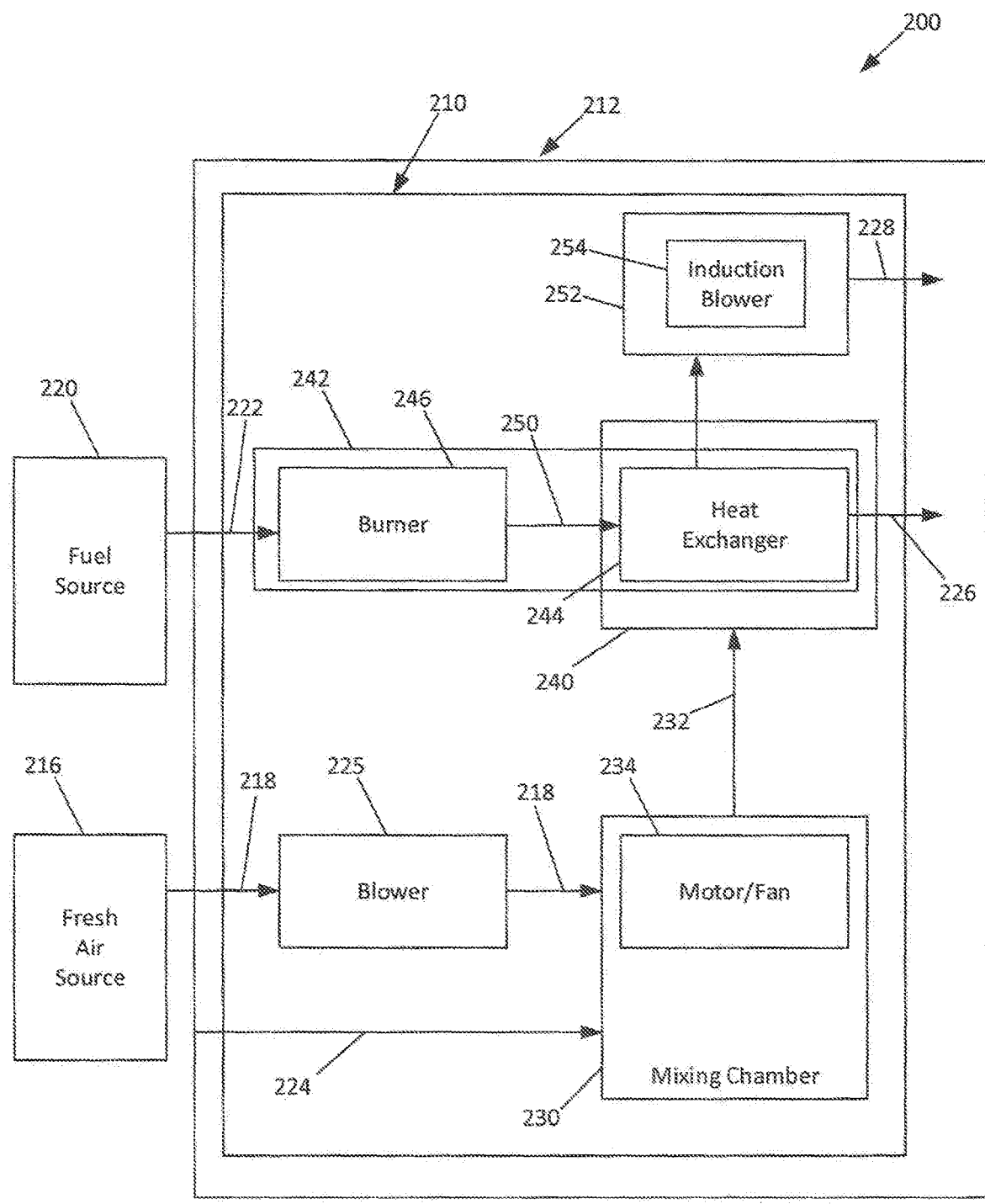
FIG. 2 is a schematic illustration an embodiment of the present invention.

FIG. 2 is a schematic illustration of an embodiment 200 of the mobile heating apparatus 210 of the present invention. Mobile heating apparatus 210 is located within an area to be heated 212. Fuel source 220 and fresh air source 216 are located outside the area to be heated 212 and provide fuel and fresh air to mobile heating apparatus 210. Further, recirculation air 224 taken from within the area to be heated 212 is provided into mobile heating apparatus 210.

Mobile heating apparatus 210 includes an air mixture chamber 230 and an air heating chamber 240. Air mixture chamber 230 receives recirculation air 224 by way of a vent or other known access way. Further, air mixture chamber 230 receives fresh air from the fresh air source 216 located outside the area to be heated 212. In this embodiment, fresh air is provided to air mixture chamber 230 via a fresh air duct 218 and blower 225, with fresh air source being the ambient air located outside of the area to be heated 212. Inside air mixture chamber 230, a fan and motor 234 mix recirculation air and fresh air together to create mixed air 232.

As shown in FIG. 2, air heating chamber 240 is in communication with air mixture chamber 230 and receives mixed air 232 via an air flow created by fan and motor 234. Within air heating chamber 240 is a heating apparatus 242. Mixed air 232 is exposed to heating apparatus 242 increasing the temperature of mixed air 232. Heated mixed air 226 is then routed out of mobile heating apparatus 210 and into the area to be heated 212. Due to heated mixed air 226 having a temperature greater than that of fresh air and the recirculation air 224, the temperature of the area to be heated 212 increases.

As further shown in FIG. 2, heating apparatus 242 includes a heat exchanger having a coiled tube 244 located within the air heating chamber 240 and a heat source 246. Heat source 246 includes at least one gas burner, such an inshot burner, and is configured to provide heated combustion gas/air flow 250 to coiled tube 244. A power vent 252 in communication with exit end of coiled tube 244. Power vent 252 includes an inducer fan and blower 254 and pulls combustion gas/air flow 250 through coiled tube 244. Combustion gas/air flow 228 is then routed into the area to be heated 212.

Figure 3:
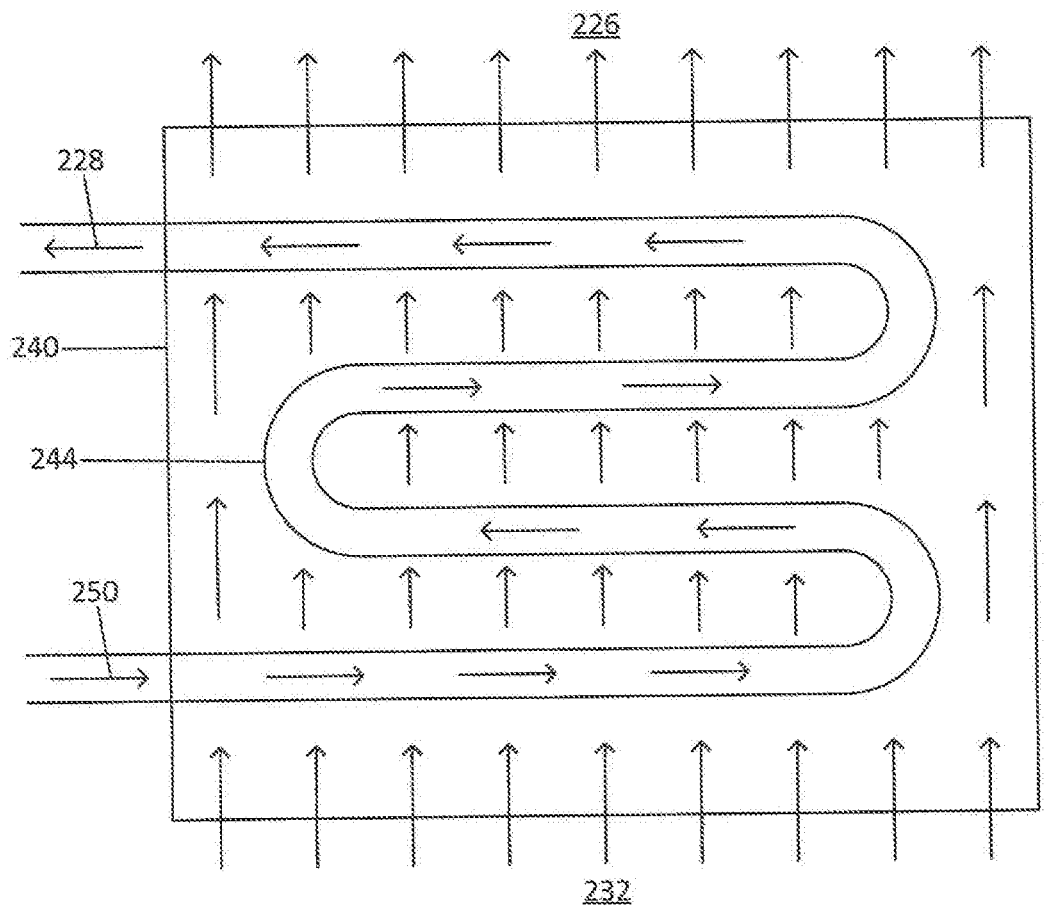
FIG. 3 is a view of an embodiment of the heat exchanger portion of the present invention.

As illustrated in FIG. 3, combustion gas/air flow 250 flows through coiled tube 244 thereby increasing the temperature of coiled tube 244. As the combustion gas/air flows through coiled tube 244, it's temperature drops due to it giving off its heat resulting in a reduced temperature air/gas flow 228 exiting coiled tube 244. Air heating chamber 240 receives combustion gas/air from heat source 246. As coiled tube 244 is located within air heating chamber 240, when the mixed fresh air/recirculation air 232 passes across coiled tube 244, the mixed air increases in temperature 226.

Figure 4:
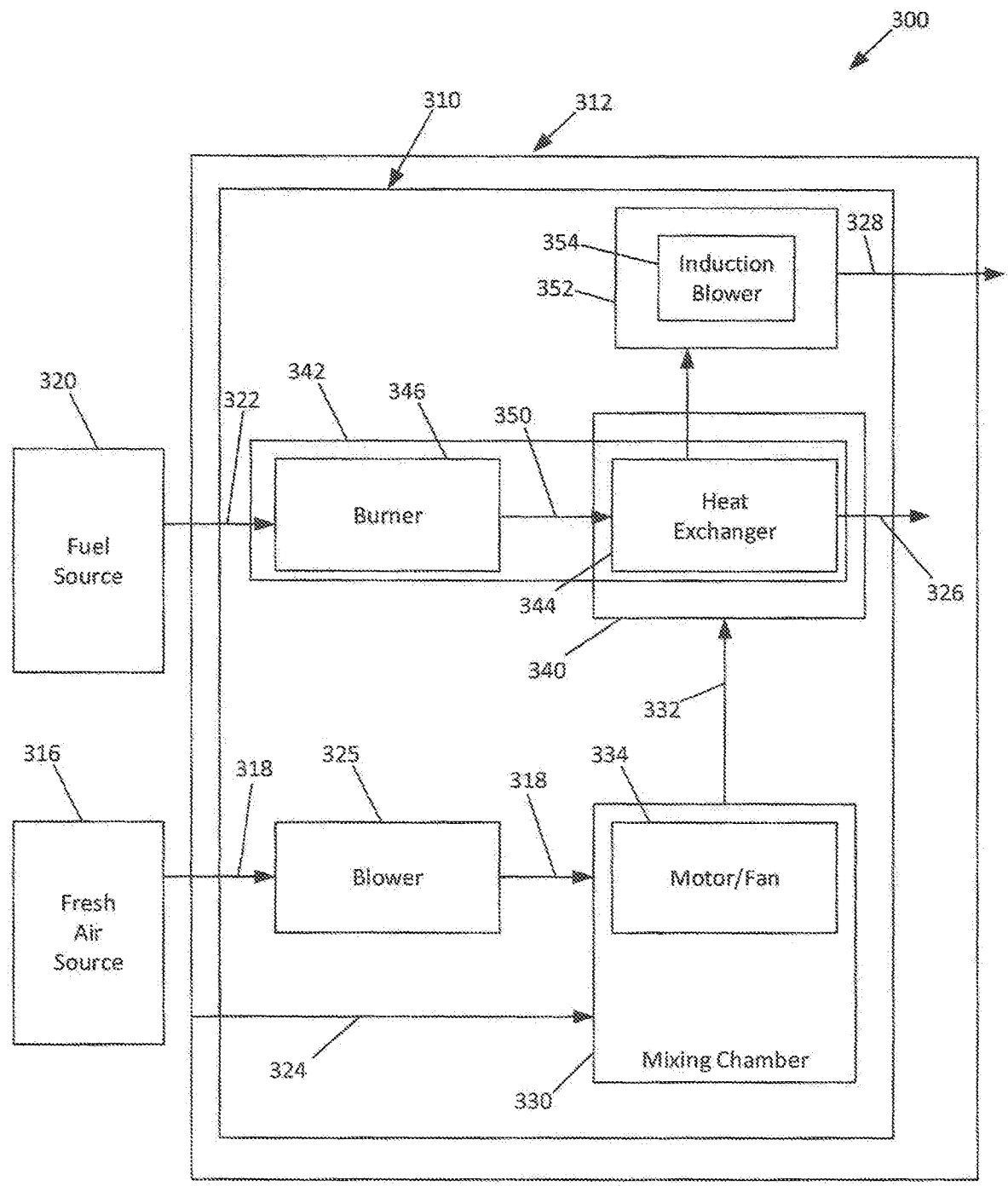
FIG. 4 is a schematic illustration an additional embodiment of the present invention.

As illustrated in FIG. 4, an additional embodiment 300 of the present invention includes the mobile heating apparatus 310 as above except the combustion gas/air flow is routed outside of the area to be heated 312.

Figure 5:
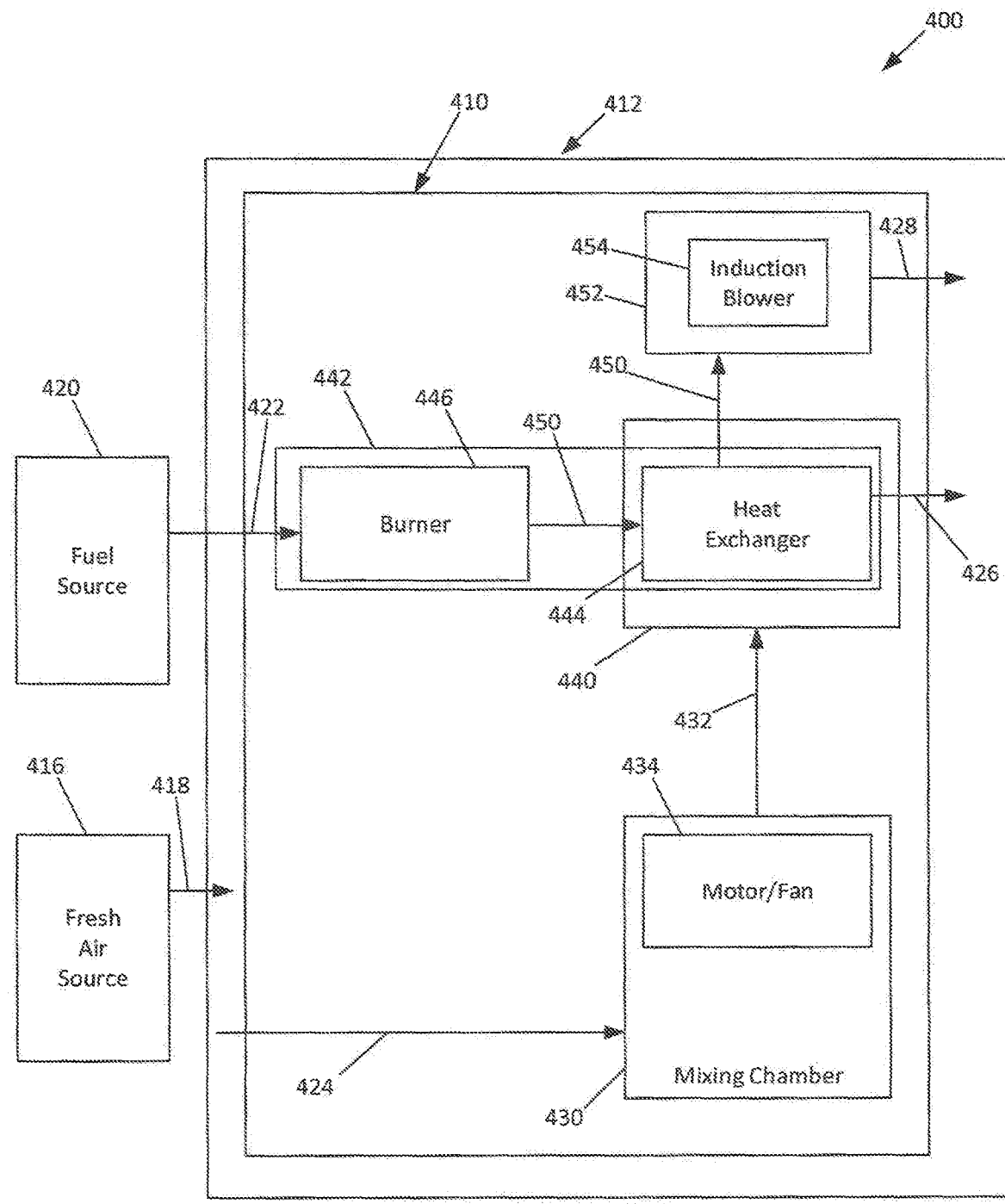
FIG. 5 is a schematic illustration an additional embodiment of the present invention.

As illustrated in FIG. 5, An additional embodiment 400 of the apparatus of the present invention includes the mobile heating apparatus having an air heating chamber 440 that is configured to receive a fresh air/recirculation air mixture 432 from within the area to be heated 412 and fuel from a fuel source 420 located outside the area to be heated 412. Fresh air 418 is routed into the area to be heated from a fresh air source 416 located outside the area to be heated 412. In this embodiment, fresh air source 416 is a door insert having a plurality of fans therein. The fans draw fresh air from outside the area to be heated 412 and into the area to be heated 412. The use of a door insert is merely illustrative. Those skilled in the art will recognize that other suitable fresh air sources can be used with this embodiment. Air chamber 430 receives mixed air 424 by way of a vent or other known access way. Mixed air 424 is a combination of fresh air 418 from the fresh air source 416 located outside the area to be heated 412 and recirculation air located within the area to be heated 412. Mixed air 432 is provided to air heating chamber 440 and heated as set out in the earlier embodiments.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification.

What is claimed:

1. A mobile heating apparatus to provide heated air to an area to be heated, the mobile heating apparatus comprising:
   an air mixture chamber having a recirculation air inlet configured to receive recirculation air from within the area to be heated and a fresh air inlet configured to receive fresh air from a fresh air source located outside of the area to be heated, the air mixture chamber configured to mix the fresh air and the recirculation air to create mixed air; and
   an air heating chamber having a mixed air inlet in communication with the air mixture chamber and configured to receive the mixed air and a heated air outlet, the air heating chamber further having
      a heating apparatus having
         a heat source, the heat source having at least one gas burner configured to receive fuel from a fuel source located outside of the area to be heated and further configured to create a combustion gas/air flow, and
         a heat exchanger in communication with the heat source and in communication with the heated air outlet, the heat exchanger configured to receive the combustion gas/air flow from the at least one gas burner allowing the combustion gas/air flow to pass therethrough and exit through the heated air outlet thereby increasing the temperature of the heat exchanger,
      the heating apparatus providing heat to the mixed air to create heated mixed air, the air heating chamber configured to route the heated mixed air through the heated air outlet into the area to be heated.

2. The mobile heating apparatus of claim 1, further comprising:
   a fresh air intake duct having a first end in communication with the fresh air inlet and a second end in communication with the fresh air source; and
   a fresh air blower to draw fresh air through the fresh air intake duct from the second end and exiting the first end.

3. The mobile heating apparatus of claim 1, the air mixture chamber further comprising:
   an air mixture/circulation apparatus configured to mix the fresh air and the recirculation air; the air mixture/circulation apparatus further configured to create air flow from the air mixture chamber through the air heating chamber.

4. The mobile heating apparatus of claim 3, wherein the air mixture/circulation apparatus comprises a circulating fan and a motor.

5. The mobile heating apparatus of claim 1, further comprising a power vent in communication with the second end of the coiled tube, the power vent configured to pull the heated combustion gas/air flow through the coiled tube and into the area to be heated.

6. The mobile heating apparatus of claim 5, wherein the at least one burner is an inshot burner.

7. The mobile heating apparatus of claim 5, wherein the fuel source is liquefied petroleum gas or natural gas.

8. The mobile heating apparatus of claim 1, further comprising a controller and at least one sensor to monitor and control carbon monoxide levels, air flow levels and temperature levels.

9. The mobile heating apparatus of claim 1, wherein the heat exchanger comprises a coiled tube, the coiled tube having a first end in communication with the heat source and a second end in communication with the heated air outlet, the heat exchanger configured to receive the combustion gas/air flow from the at least one gas burner through the first end of the coiled tube allowing the combustion gas/air flow to pass therethrough and exit at the second end of the coiled tube thereby increasing the temperature of the coiled tube.

10. The mobile heating apparatus of claim 1, wherein the heat exchanger comprises a plurality of metal panels configured in a serpentine configuration, the serpentine configuration having a first end in communication with the heat source and a second end in communication with the heated air outlet, the heat exchanger configured to receive the combustion gas/air flow from the at least one gas burner through the first end of the coiled tube allowing the combustion gas/air flow to pass therethrough and exit at the second end of the coiled tube thereby increasing the temperature of the coiled tube.

11. The mobile heating apparatus of claim 1, wherein the heated air outlet of the heat exchanger is further defined as being in communication with the area to be heated thereby providing the combustion gas/air flow into the area to be heated.

12. The mobile heating apparatus of claim 1, wherein the heated air outlet of the heat exchanger is further defined as being in communication with the area outside of the area to be heated thereby providing the combustion gas/air flow outside of the area to be heated.

13. A mobile heating apparatus to provide heated air and fresh air to an area, the mobile heating apparatus comprising:
   an air mixture chamber having a recirculation air inlet configured to receive recirculation air from within the area to be heated and a fresh air inlet configured to receive fresh air from a fresh air source located outside of the area to be heated, the air mixture chamber configured to mix the fresh air and the recirculation air to create mixed air; and
   an air heating chamber having a mixed air inlet in communication with the air mixture chamber and configured to receive the mixed air and a heated air outlet, the air heating chamber further having
      a heating apparatus having
         a heat source, the heat source having at least one gas burner configured to receive fuel from a fuel source located outside of the area to be heated and further configured to create a combustion gas/air flow, and
         a heat exchanger in communication with the heat source and in communication with the heated air outlet, the heat exchanger configured to receive the combustion gas/air flow from the at least one gas burner allowing the combustion gas/air flow to pass therethrough and exit through the heated air outlet thereby increasing the temperature of the heat exchanger,
      the heating apparatus providing heat to the mixed air to create heated mixed air, the air heating chamber configured to route the heated mixed air through the heated air outlet into the area to be heated; and a fresh air delivery apparatus, consisting of at least one fan, having an air inlet configured, to receive fresh air from outside the area to be heated, and an air outlet configured to deliver fresh air to the area to be heated.

14. The mobile heating apparatus of claim 13 wherein the air heating chamber and fresh air delivery apparatus are in electrical communication to one another by way of at least one electrical cord.

15. The mobile heating apparatus of claim 13 wherein the air received by the air heating chamber from the area to be heated comprises a mixture of heated recirculation air located within the area to be heated and fresh air provided by the fresh air delivery apparatus from a fresh air area located outside of the area to be heated.

16. The mobile heating apparatus of claim 13 wherein the desired temperature of the area to be heated is in excess of 120 degrees Fahrenheit.

17. The mobile heating apparatus of claim 13, further comprising a power vent in communication with the second end of the coiled tube, the power vent configured to pull the heated combustion gas/air flow through the coiled tube and into the area to be heated.

18. The mobile heating apparatus of claim 13, wherein the at least one burner is an inshot burner.

19. The mobile heating apparatus of claim 13, wherein the fuel source is liquefied petroleum gas or natural gas.

20. The mobile heating apparatus of claim 13, further comprising a controller and at least one sensor to monitor and control carbon monoxide levels, air flow levels and temperature levels.

* * * * *